(12) United States Patent
Zhang et al.

(10) Patent No.: US 10,266,412 B2
(45) Date of Patent: Apr. 23, 2019

(54) PREPARATION METHOD OF GRAPHENE

(71) Applicant: SHENZHEN CANTONNET ENERGY SERVICES CO., LTD., Shenzhen (CN)

(72) Inventors: Linde Zhang, Shenzhen (CN); Mingdong Zhang, Shenzhen (CN)

(73) Assignee: SHENZHEN CANTONNET ENERGY SERVICES CO., LTD., Shenzhen (CN)

(*) Notice: Subject to any disclaimer, the term of this patent is extended or adjusted under 35 U.S.C. 154(b) by 37 days.

(21) Appl. No.: 15/730,751

(22) Filed: Oct. 12, 2017

(65) Prior Publication Data
US 2018/0029889 A1 Feb. 1, 2018

Related U.S. Application Data

(62) Division of application No. 15/106,840, filed on Jun. 21, 2016, now Pat. No. 9,938,150.

(51) Int. Cl.
| | | |
|---|---|---|
| *C01B 32/182* | (2017.01) | |
| *C01B 32/192* | (2017.01) | |
| *C01B 32/20* | (2017.01) | |
| *C01B 32/184* | (2017.01) | |
| *C01B 32/198* | (2017.01) | |

(52) U.S. Cl.
CPC .......... *C01B 32/182* (2017.08); *C01B 32/184* (2017.08); *C01B 32/192* (2017.08); *C01B 32/198* (2017.08); *C01B 32/20* (2017.08); *C01B 2204/20* (2013.01)

(58) Field of Classification Search
CPC .............................. C01B 31/04; C01B 31/043
See application file for complete search history.

(56) References Cited

FOREIGN PATENT DOCUMENTS

| | | | |
|---|---|---|---|
| CN | 103253655 | A | 8/2013 |
| CN | 103407993 | A | 11/2013 |
| CN | 103427088 | A | 12/2013 |
| JP | 2013245116 | A * | 12/2013 |

OTHER PUBLICATIONS

English machine translation of CN103253655.*
English machine of CN103407993.*
English machine of CN103427088.*

* cited by examiner

*Primary Examiner* — Richard M Rump
(74) *Attorney, Agent, or Firm* — Gokalp Bayramoglu

(57) ABSTRACT

The invention relates to a preparation method of graphene using graphene oxide. The method consists of the following steps. (1). Preparation of graphene oxide-dispersant solution; (2). Reduction of graphene oxide; (3). Obtaining graphene by suction filtration and drying process. Based on the preparation of anthracite, the invention could reduce production costs effectively comparing to traditional preparation methods of graphene, and make the reaction more fast and complete, facilitating the achievement of large scale industrial production.

3 Claims, No Drawings

PREPARATION METHOD OF GRAPHENE

CROSS REFERENCE

This application is a divisional application of application Ser. No. 15/106,840 filed on Jun. 21, 2016 which is a national phase entry of International Application No. PCT/CN2013/091258. The content of these related applications is incorporated herein by reference.

TECHNICAL FIELD

The present invention relates to a preparation method of graphene, specifically referring to a preparation method of graphene and graphene oxide based on anthracite.

BACKGROUND

Since Andre Geim and Konstanin Novoselof from University of Manchester in UK successfully stripped pyrolytic graphite out and observed graphene in 2004 (Novoselov, K. S.; Geim, A. K.; Morozov, S. V.; Jiang, D.; Zhang, V; Dubonos, S. V.; Grigorieva I. V.; Firsov, A. A. Science 2004, 306, 666-9), new carbon materials has been remaining a hot topic in relevant areas. The success of stripping graphene out breaks the prediction about thermal instability of two-dimensional crystal theoretically, and brings about possibilities for more investigations and explorations in new fields.

Perfect graphene is supposed to own ideal two-dimensional structure, which consists of hexagonal lattice. Every single carbon atom is combined with other three carbon atoms by σ bond in the direction of lattice plane, and non-bonding electrons serves as π electrons, forming π orbit system vertical to the lattice plane. As the π electron could move randomly in the plane-graphene can sustain electric current densities six orders higher than copper. Meanwhile, Graphene shows record thermal conductivity. The thermal conductivity of pure graphene could reach 2000-4000 $W \cdot m^{-1} \cdot K^{-1}$, and also has excellent strength and large surface area. Besides, the special structure of graphene provides unique energy band structure and enables it with half integer quantum hall effect and perfect tunneling effect, as well as electrical conductivity that would never fade away. The special characteristics mentioned above guarantee graphene a promising prospect of application in fields of materials and electronic circuits.

There're two traditional ways to synthesize graphene, which are physical method and chemical method respectively. Properties of graphene obtained through the two methods are different from each other. Physical methods include mechanical stripping, electric arc discharge, ultrasonic dispersion etc. Graphene layers obtained through physical methods are comparatively intact, but there're problems like low productivity, uncertainty of quality, command for special equipment and high cost. While chemical methods include bottom up organic synthesis, oxidation-reduction process, solvothermal synthesis and chemical vapor deposition. Equipment and raw materials are strictly required for organic synthesis method, so it's difficult to achieve mass production in this way. Production quality isn't stable for solvothermal method, thus the average quality is poor. Chemical vapor deposition method costs too high and cannot achieve scale production. Among all those methods, only oxidation-reduction process can work without special equipment, and quality of graphene obtained through this method is stable. Thus it's the most suitable way for industrialized production.

During the oxidation-reduction process for graphene preparation, intermediates of graphene oxide has been involved. The intermediates are supposed to go through intercalation by strong acid. Then the intercalated graphene goes through deep oxidation by strong oxidant to form large quantity of carboxyl and carbonyl groups around the graphene layers, and then form large quantity of hydroxyl and epoxy groups within the graphene layers. After ultrasonic exfoliation, we can obtain graphene oxide with a certain degree of dispersion. A large amount of strong acid and strong oxidant is used in this step, meanwhile the heat release is quite serious. As a result, equipments for graphene preparation must meet strict standards, and it's difficult to achieve mass production. Besides, during the oxidation-reduction process for graphene preparation, high quality graphite is required, and we usually use crystalline flake graphite of higher price and purity as main material, which increases the cost of graphene production further. Production cost for high quality single-layer graphene is especially high. Therefore, if we could develop raw materials at low cost for graphene or graphene oxide, and design a reasonable manufacturing technique based on the material, we would be able to lower the production difficulty and cost effectively and make it possible to put graphene into mass production.

Coal serves as a traditional material in chemical engineering and energy fields. Chemical composition of coal can be regarded as macromolecule polymerized by large amounts of condensed rings with different condensation degrees and different groups. There're a few aliphatic rings and heterocyclic rings apart from the condensed rings, as well as some carbon groups like alkyl. Except for carbon group, there're lots of alkoxy, hydroxyl, carboxyl and sulfhydryl groups in coal, and some complex groups (mainly oxygen-containing groups), containing oxygen, suffer and nitrogen like amidogen. Therefore, we can classify coals into different categories according to the ratio of carbon content in carbon groups and oxygen content in oxygen-containing groups. Anthracite, with highest degree of coalification, one kind of coal with highest carbon content. In general, the value of carbon content could reach 90%. The number of aromatic nucleus in basic anthracite structures increases dramatically which tends to show graphite structure gradually, and it was obviously observed in models of Larsen (Cooper, B. R., Petrakis, L. Eds., American Institute of Physics: New York, 66-81 (1981)). Theoretically, this graphite-like structure can effectively serve as precursor of graphene and graphene oxide synthesis. Coal resources are abundant in our country and thus the price is low. If we can use anthracite as raw material of graphene, the production cost can be significantly reduced. Besides, there're always residues of hydroxy, carbonyl and carboxyl groups in anthracite, which are more favorable for formation of graphene oxide compared to graphite.

SUMMARY

In order to solve the problem of ugh production cost for graphene oxide and grapheme, we put forward a preparation method of grapheme oxide and graphene based on anthracite, which could effectively reduce the production cost.

The technical proposal adopted in our invention for problems mentioned above is depicted as follows.

The preparation method of graphene oxide based on anthracite includes the following steps:

a. Preparation of ultra-clean anthracite powder. The raw materials of anthracite are put into processes of washing, drying and grinding, and then put them through 200-mesh sieves to obtain anthracite.

Process the anthracite powder with hydroxide of molten alkali metal, which could remove sulfur and silicon impurities and radicals away from anthracite powder and make it more pure and clean. Then wash it till the pH value reaching 7-8, which is quite close to neutral. Then after drying we can obtain ultra-clean anthracite powder. The alkali metal mentioned above should be one of potassium hydroxide, sodium hydroxide and cesium hydroxide, or a mixture of two or more of them.

b. Pretreatment of ultra-clean anthracite powder. Put the ultra-clean anthracite powder obtained through step a. into dispersant and process it with ultrasonic treatment to obtain dispersing liquid of 0.1-0.5 g/ml. The dispersant mentioned above is one of the liquid like deionized water, mineral acid, surfactant solution, and high boiling solvent, or a mixture of two or more of them. The dispersant mentioned above is one of deionized water, strong phosphoric acid, concentrated sulfuric acid, concentrated nitric acid, aqueous CTAB (cetyltrimethyl ammonium bromide) solution with mass concentration being 5%, aqueous TBAB (tetra butyl ammonium bromide) solution with mass concentration being 5%, glycerol, glycol and N-methyl-2-pyrrolidone, or a mixture of two or more of them.

Then mix the dispersing liquid with pre-oxidant and put it through ultrasonic treatment. This helps to open the aggregation structure of polyaromatic in anthracite and widen the distance between polyaromatic structures, making it convenient for next step of oxidation treatment. The mass ratio of ultra-clean anthracite powder and pre-oxidant is 1 to 0-5. The pie-oxidant mentioned above is one of the materials like nitrate, dichromate, persulfate, permanganate, peroxide, phosphorus oxide and oxyiodide, or a mixture of two or more of them. The optimization of pre-oxidant is one of ammonium persulfate, potassium persulfate, potassium nitrate, phosphoric anhydride and iodine pentoxide, or a mixture of two or more of them.

After ultrasonic treatment, put the dispersing liquid with pre-oxidant into process of water filtration to remove remaining dispersant in it, and put it into heat-treatment under microwave conditions of 400-900 W for 5-30 min. After naturally cooling, put the mixture into grinding and sieving treatment and we can obtain ultra-clean anthracite powder with pre-treatment.

c. Preparation of anthracite oxide dispersion. Put the ultra-clean anthracite powder with pre-treatment obtained through step b. into intercalation agent, and obtain intercalation dispersion of 0.1-5 g/ml. The intercalation agent mentioned above is one of the materials of inorganic acid and inorganic salt, or a mixture of two or more of them. The optimization for intercalation agent is one of concentrated sulfuric acid, strong phosphoric acid, boric acid, ferric trichloride, alchlor and sodium borate, or a mixture of two or more of them.

Then put the intercalation dispersion into ultrasonic treatment with temperature of 20° C. for 0.5-2 hours, then mix it with oxidizing agent. The mass ratio of oxidizing agent and ultra-clean anthracite powder with pre-treatment is 1 to 2-10. The oxidizing mentioned above is one of the materials of perchloric acid, nitric acid, sulfuric acid, persulfate, permanganate, chlorate and perchlorate, or a mixture of two or more of them. The optimization for oxidizing agent is one of permanganate, chlorate, fuming nitric acid and perchlorate, or a mixture of two or more of them.

Then add aromatization catalyst into intercalation dispersion, which could make those non-aromatic groups in anthracite well-aromatized and thenoxidized better. Compared with traditional methods, we can reduce the dosage of oxidant and strong acid by this way, and avoid the strict conditions required for oxidation of non-aromatic groups. Thus we can save the production cost and make the reaction rate quicker and more complete when preparing graphene oxide. The mass ratio of ultra-clean anthracite powder with pre-treatment to aromatization catalyst is 100 to 0-10. The aromatization catalyst mentioned above is one of the materials of cuprous chloride, ferric trichloride, ferrous chloride, zinc chloride, nickel chloride, manganese chloride, molybdenum trioxide, ammonium molybdate, molybdenum phosphide and zinc phosphide, or a mixture of two or more of them. The optimization for aromatization catalyst is one of ferric trichloride, nickel chloride and molybdenum trioxide, or a mixture of two or more of them.

Then treat the intercalation dispersion which contains oxidizing agent and aromatization catalyst under ultrasonic environment of 30-50° C. for 0.5-2 hours. After the oxidation and aromatization processes are finished, add deionized water which is the same volume as intercalation dispersion. Hydrolyze the mixture at constant temperature of 70-100° C. for 1-5 min, which could protect the oxygen-containing functional groups in anthracite from being damaged.

Then add hydrogen peroxide into intercalation dispersion to remove needless oxidant. The mentioned mass ratio of hydrogen peroxide to ultra-clean anthracite powder with pre-treatment is 1:5-20. After the process of suction filtration and washing, we can obtain anthracite oxide dispersion.

d. Preparation of graphene oxide colloid solution. Treat the anthracite oxide dispersion obtained through step c. with ultrasonic stripping process for 1-5 h, with ultrasonic power being 100-600 W and we can obtain graphene oxide colloid solution. The optimization for drying process is drying the mixture in vacuum oven for 2 hours.

e. Preparation of graphene oxide. Treat the graphene oxide colloid solution from step d. with centrifugal process to remove unstripped anthracite and other carbon impurities, with rotating speed being 4000 r/min and centrifugation time being 5 min, and then take the supernatant of it, which is exactly the graphene oxide solution.

Put ammonium sulfate solution with 2-5% mass concentration into the supernatant, then salt out and suction filtrate it, and wash the filter cake with deionized water. Treat the mixture with alcohol washing and drying, and we can obtain grapheme oxide.

The preparation method of graphene using graphene oxide obtained through preparation method above comprises the following steps.

f. Put graphene oxide mentioned above into dispersant, and formulate graphene oxide-dispersant solution of 0.1-1 g/ml. The mentioned dispersant is one of the liquid like deionized water, inorganic acid, surfactant solution, and high boiling solvent, or a mixture of two or more of them. The optimization for dispersant mentioned above is one of deionized water, strong phosphoric acid, concentrated sulfuric acid, concentrated nitric acid, aqueous CTAB (cetyltrimethyl ammonium bromide) solution with mass concentration being 5%, aqueous TBAB (tetra butyl ammonium bromide) solution with mass concentration being 5%, glycerol, glycol and N-methyl-2-pyrrolidone, or a mixture of two or more of them.

g. Heat the graphene oxide-dispersant solution obtained from step f. in microwave oven for 5-20 min. The power of microwave oven is 900 W, or Put reducing agent into graphene oxide-dispersant solution obtained from step f. and reflux the mixture for 1 hour. The mass ratio of reducing agent to graphene oxide is 1:1-5. The mentioned reducing agent is one of electronic ammine solution with mass concentration being 1%, hydrazine hydrate with mass concentration being 80%, sodium thiosulfate, united dithionite and phosphite ester, or a mixture of two or more of them. The optimization for reducing agent is one of hydrazine hydrate with mass concentration being 80%, electronic ammine solution with mass concentration being 1%, and united dithionite and phosphite ester, or a mixture of two or more of them.

h. Put the graphene oxide-dispersant solution obtained from step g. into supersonic treatment for 0.5-3 hours, with supersonic power being 100-300 W.

After supersonic treatment, put the graphene oxide-dispersant solution into processes of suction filtration and drying. The purpose of suction filtration is to remove needless dispersant and reducing agent. Then we can obtain graphene.

Compared to existing techniques, the preparation method of graphene oxide and graphene based onanthracite in our invention owns the following advantages. Firstly, regards to the raw materials, anthracite costs much less than graphite, and there're oxygen-containing groups in anthracite molecules, which could make the preparation process much easier than using graphite and thus reduce the production cost. Secondly, the pre-oxidation of anthracite by pre-oxidant in our invention could open the polymerization bond among aromatization structures and widen the distances between them, which could make the next oxidation step quicker and more complete. Besides, we adopt aromatization catalyst in our invention to aromatize those non-aromatic groups in anthracite and make them better oxidized. Through this way we can reduce the dosage of oxidant and strong acid etc. compared to traditional methods, and avoid the strict conditions required for oxidation of non-aromatic groups. Thus we can save the production cost and make the reaction rate quicker and more complete when preparing graphene oxide, facilitating large-scale industrial production.

Further details of our present invention are described with specific embodiments below.

DETAILED DESCRIPTION OF THE INVENTION

Execution Example 1

Put the raw materials of anthraciteinto processes of washing, drying and grinding, and then put them through 200-mesh sieves to obtain comparatively pure anthracite powder. Process the anthracite powder with molten sodium hydroxide, which could remove sulfur and silicon impurities and radicals in it. Then wash it till the pH 7 and dry it, then we can obtain ultra-clean anthracite powder. Take 1 g of anthracite powder, put it through ultrasonic dispersion into 10 ml of concentrated sulfuric acid. Then mix it with potassium dichromate and process the mixture with ultrasonic treatment for 0.5 hours. Add water to dilute the mixture, and then suction filtrate it to remove the solvent. Heat the mixture at microwave condition of 900 W for 5 min and after a process of air drying grinding and sieving, we can obtain ultra-clean anthracite powder (For simplicity, it is referred to as anthracite powder in next section of this embodiment) with pre-treatment.

Take some anthracite powder and disperse it into 10 ml of concentrated sulfuric acid, and process the mixture with ultrasonic treatment of 20° C. for 0.5 hours. Then add potassium hypermanganate the mass ratio of which to anthracite powder is 1 to 4, in the term of 1 g per minute into the mixture system. Then add 0.1 g ferric trichloride into the mixture and treat it with ultrasonic process at temperature 40° C. for 1 hour. After the process of oxidation and aromatization, add deionized water which is the same volume as the reaction system and put it into pyrohydrolysis for 5 min, with temperature being controlled below 100° C., in order to protect the oxygen-containing functional groups from being damaged. Finally, after hydrolysis, add hydrogen peroxide with the mass ratio of anthracite to it being 1 to 5 to remove needless oxidant. Then process the mixture with suction filtration and drying, and we can obtain the dispersed liquid of anthracite oxide.

Then treat the mixture with ultrasonic stripping process with ultrasonic power being 120 W for 0.5 hours to obtain graphene oxide colloid solution. Put the solution into centrifugal process with rotating speed being 4000 r min for 5 min to remove unstrapped graphene oxide and other carbon impurities. Then take the supernatant as graphene oxide solution. Add the same volume of ammonium sulfate solution with 2% mass concentration as the mixture to salt out and suction filtrate it. Wash the filter cake with 5 ml of deionized water, and then wash it with 5 ml of ethyl alcohol and dry it in a vacuum oven with temperature being 55° C. for 2 hours. After all those processes, we obtain the first target product, graphene oxide, with the total mass of 1.2 g. The productive rate is 120% in term of anthracite powder.

Disperse graphene oxide obtained above in glycerol with mass concentration being 0.1 g/ml and heat the mixture in, a microwave oven with 900 W power for 10 min. After that put the mixture into ultrasonic cleaner with 120 W power for ultrasonic treatment of 0.5 hours, and filtrate it. Then dry it under vacuum environment of 120° C. for 1 hour and we can obtain the second target product, graphene with a total mass of 0.83 g. The productive rate is 83% in term of anthracite.

Both graphene oxide and graphene of our products, characterized by Raman spectra, have D-peak, G-peak and 2D-peak, which are unique to graphene. D-peak of graphene oxide is 1334 $cm^{-1}$, and G-peak and 2D-peak are 1609 $cm^{-1}$ and 2833 $cm^{-1}$, respectively; D-peak of graphene is 1335 $cm^{-1}$, and G-peak and 2D-peak are 1587 $cm^{-1}$ and 2674 $cm^{-1}$, respectively.

Execution Example 2

Put the raw materials of anthracite into processes of washing, drying and grinding, and then put them through 200-mesh sieves to obtain comparatively clean anthracite powder. Process the anthracite powder with molten sodium hydroxide, which could remove sulfur and silicon impurities and radicals in it. Then wash it till the pH value reaching 8 and dry it, then we can obtain ultra-clean anthracite powder. Take 1 g of anthracite powder, put it through ultrasonic dispersion into 5 ml deionized water. Then add ammonium persulfate into the mixture and process it with ultrasonic treatment for 0.5 hours. Add water to dilute the mixture and then suction filtrate it to remove the solvent. Heat the mixture at microwave condition of 900 W for 10 min and after air drying grinding and sieving, we can obtain ultra-clean anthracite powder (For simplicity it is referred to as anthracite powder in next section of this embodiment) with pre-treatment.

Take some anthracite powder and disperse it into 10 ml of concentrated phosphoric acid, and process the mixture with ultrasonic treatment of 20° C. for 1 hour. Then add potassium chlorate and potassium hypermanganate the mass ratio of which to anthracite powder is 1:3 and 1:4, respectively, in the term of 1 g per minute into the mixture system. Then add 0.05 g nickel chloride into the mixture and treat it with ultrasonic process with temperature being 40° C. for 1 hour. After the process of oxidation and aromatization, add deionized water which is the same volume as the reaction system and put it into pyrohydrolysis for 5 min, with temperature being controlled below 100° C., in order to protect the oxygen-containing functional groups from being damaged. Finally, after pyrohydrolysis is finished, add hydrogen peroxide with the mass ratio of anthracite to it being 1:10 to remove needless oxidant. Then process the mixture with suction filtration and washing, and we can obtain the dispersion liquid of anthracite oxide.

Then treat the mixture with ultrasonic stripping process with ultrasonic power being 300 W for 1 hour to obtain graphene oxide colloid solution. Put the solution into centrifugal process with rotating speed being 4000 r/min for 5 min to remove unshipped graphene oxide and other carbon impurities. Then take the supernatant as graphene oxide solution. Add the same volume of ammonium sulfate solution with 2% mass concentration as the mixture to salt out and suction filtrate it. Wash the filter cake with 5 ml of deionized water, and then wash it with 5 ml of ethyl alcohol and dry it in a vacuum oven with temperature being 55° C. for 2 hours. After all those processes, we obtain the first target product, graphene oxide with the total mass of 1.1 g. The productive rate is 110% in term of anthracite powder.

Disperse graphene oxide obtained above in glycerol with mass concentration being 0.1 g/ml, and heat the mixture in a microwave oven with 900 W power for 10 min. After that put the mixture into ultrasonic cleaner with 120 W power for ultrasonic treatment. of 0.5 hours, and suction filtrate it. Then dry it under vacuum environment of 120° C. for 1 hour and we can obtain the second target product, graphene, with a total mass of 0.64 g. The productive rate is 64% in term of anthracite.

Both graphene oxide and graphene of our products, characterized by Raman spectra, have D-peak, G-peak and 2D-peak, which are unique to graphene. D-peak of graphene oxide is 1365 $cm^{-1}$, and G-peak and 2D-peak are 1589 $cm^{-1}$ and 2865 $cm^{-1}$, respectively; D-peak of graphene is 1325 $cm^{-1}$, and G-peak and 2D-peak are 1582 $cm^{-1}$ and 2696 $cm^{-1}$, respectively.

Execution Example 3

Put the raw materials of anthracite into processes of washing, drying and grinding, and then put them through 200-mesh sieves to obtain comparatively clean anthracite powder. Process the anthracite powder with molten potassium hydroxide, which could remove sulfur and silicon impurities and radicals in it. Then wash it till the pH value reaching 7.5 and dry it, then we can obtain ultra-clean anthracite powder. Take 1 g of anthracite powder, put it through ultrasonic dispersion into 5 ml aqueous CTAB solution with mass concentration being 5%. Then add 3 g of potassiumpersulfate into the mixture and process it with ultrasonic treatment for 0.5 hours. Add water to dilute the mixture and then suction filtrate it to remove the solvent. Put the mixture into heating process under microwave condition of 900 W for 10 min and after a process of air drying, grinding and sieving, we can obtain ultra-clean anthracite powder (For simplicity, it is referred to as anthracite powder in next section of this embodiment) with pre-treatment.

Take some anthracite powder and disperse it into 5 ml of concentrated sulfuric acid, and process the mixture with ultrasonic treatment of 20° C. for 1 hour. Then add potassium chlorate and fuming nitric acid of which the mass ratio to anthracite powder is 1:3 and 1:3, respectively, in the term of 1 g per minute into the mixture system. Then add 0.1 g zinc chloride into the mixture and treat it with ultrasonic process with temperature being 45° C. for 2 hours. After the process of oxidation and aromatization, add deionized water which is the same volume as the reaction system and put it into pyrohydrolysis for 5 min, with temperature being controlled below 100° C., in order to protect the oxygen-containing functional groups of graphene oxide from being damaged. Finally, after the process of pyrohydrolysis, add hydrogen peroxide with the mass ratio of anthracite to it being 1:10 to remove needless oxidant. Then process the mixture with suction filtration and washing, and we can obtain the dispersed liquid of anthracite oxide.

Then treat the mixture with ultrasonic stripping process with ultrasonic power being 300 W for 1 hour to obtain graphene oxide colloid solution. Put the solution into centrifugal process with rotating speed being 4000 r/min for 5 min to remove unshipped graphene oxide and other carbon impurities. Then take the supernatant as graphene oxide solution. Add the same volume of ammonium sulfate solution with 2% mass concentration as the mixture to salt out and suction filtrate it. Wash the filter cake with 5 ml deionized water, and then wash it with 5 ml ethyl alcohol and dry it in a vacuum oven with temperature being 55° C. for 2 hours. After all those processes, we obtain the first target product, graphene oxide, with the total mass of 1.32 g. The productive rate is 132% in term of anthracite powder.

Disperse graphene oxide obtained above in glycol with mass concentration being 0.1 g/ml, and heat the mixture in a microwave oven with 900 W power for 20 min. After that put the mixture into ultrasonic cleaner with 300 W power for ultrasonic treatment of 1 hour, and suction filtrate it. Then thy it under vacuum environment of 120° C. for 1 hour and we can obtain the second target product, graphene, with a total mass of 0.96 g. The productive rate is 96% in term of anthracite.

Both graphene oxide and graphene of our products, characterized by Raman spectra, have D-peak, G-peak and 2D-peak, which are unique to graphene. D-peak of graphene oxide is 1375 $cm^{-1}$, and G-peak and 2D-peak are 1583 $cm^{-1}$ and 2810 $cm^{-1}$ respectively; D-peak of graphene is 1380 $cm^{-1}$, and G-peak and 2D-peak are 1588 $cm^{-1}$ and 2759 $cm^{-1}$, respectively.

Execution Example 4

Put the raw materials of anthracite into processes of washing, drying and grinding, and then put them through 200-mesh sieves to obtain comparatively clean anthracite powder. Process the anthracite powder with molten cesium hydroxide, which could remove sulfur and silicon impurities and radicals in it. Then wash it till the pH value reaching 7.8 and dry it, then we can obtain ultra-clean anthracite powder. Take 1 g of anthracite powder, put it through ultrasonic dispersion into 10 ml of aqueous solution of glycol with mass concentration being 70%. Then add 5 g nitrite of potash into the mixture and process it with ultrasonic treatment for 0.5 hours. Add water to dilute the mixture and then suction filtrate it to remove the solvent. Put the mixture into heating process under microwave of 400 W for 30 min and after air drying grinding and sieving, we on obtain ultra-clean anthracite powder (For simplicity, it is referred to as anthracite powder in next section of this embodiment) with pre-treatment.

Take some of the anthracite powder and dispersed it into a mixture of 1 ml concentrated sulfuric acid and 2 ml strong phosphoric acid, and process the mixture with ultrasonic treatment of 20° C. for 1 hour. Then add filming nitric acid the mass ratio of which to anthracite powder is 1:7 and 0.01 g ammonium molybdate into the mixture and treat it with ultrasonic process with temperature being 35° C. for 2 hours. After the process of oxidation and aromatization, add deionized water which is the same volume as the reaction system and put it into pyrohydrolysis for 3 min, with temperature being controlled below 100° C., in order to protect the oxygen-containing functional groups of graphene oxide from being damaged. Finally, after the process of pyrohydrolysis add hydrogen peroxide with the mass ratio of anthracite to it being 1:20 to remove needless oxidant. Then process the mixture with suction filtration and washing, and we can obtain the dispersed liquid of anthracite oxide.

Then treat the mixture with ultrasonic stripping process with ultrasonic power being 600 W for 1 hour to obtain graphene oxide colloid solution. Put the solution into centrifugal process with rotating speed being 4000 r/min for 5 min to remove unstrapped graphene oxide and other carbon impurities. Then take the supernatant as graphene oxide solution. Add the same volume of ammonium sulfate solution with 2% mass concentration as the mixture to salt out and suction filtrate it. Wash the filter cake with 5 ml deionized water, and then wash it with 5 ml ethyl alcohol and dry it in a vacuum oven with temperature being 55° C. for 2 hours. After all those processes, we obtain the first target product, graphene oxide, with the total mass of 1.28 g. The productive rate is 128% in term of anthracite powder.

Disperse graphene oxide obtained above in N-methyl pyrrolidone with mass concentration being 1 g/ml, and heat the mixture in a microwave oven with 900 W power for 20 min. After that put the mixture into ultrasonic cleaner with 300 W power for ultrasonic treatment of 3 hours, and suction filtrate it. Then dry it under vacuum environment of 120° C. for 1 hour and we can obtain the second target product, graphene, with a total mass of 0.9 g. The productive rate is 90% in term of anthracite.

Both graphene oxide and graphene of our products, characterized by Raman spectra, have D-peak, G-peak and 2D-peak, which are unique to graphene. D-peak of graphene oxide is 1356 $cm^{-1}$, and G-peak and 2D-peak are 1610 $cm^{-1}$ and 2782 $cm^{-1}$, respectively; D-peak of graphene is 1346 $cm^{-1}$, and G-peak and 2D-peak are 1577 $cm^{-1}$ and 2739 $cm^{-1}$, respectively.

Execution Example 5

Put the raw materials of anthracite into processes of washing, drying and grinding, and then put them through 200-mesh sieves to obtain comparatively clean anthracite powder. Process the anthracite powder with molten sodium hydroxide, which could remove sulfur and silicon impurities and radicals in it. Then wash it till the pH value reaching 7.2 and dry it, then we can obtain ultra-clean anthracite powder. Take 1 g of anthracite powder, put it through ultrasonic dispersion into 5 ml N-methyl pyrrolidone. Then add 3 g Iodinepentoxide into the mixture and process it with ultrasonic treatment for 1 hour. Add water to dilute the mixture and then suction filtrate it to remove the solvent. Put the mixture into heating process under microwave condition of 400 W for 30 min and after air drying, grinding and sieving, we can obtain ultra-clean anthracite powder (For simplicity, it is referred to as anthracite powder in next section of this embodiment) with pre-treatment.

Take some anthracite powder and disperse it into 10 ml sulfuric acid, and process the mixture with ultrasonic treatment of 20° C. for 1 hour. Then gently add fuming nitric acid and potassium perchlorate the mass ratio of which to anthracite powder is 1:3 and 1:2, respectively. Then add 0.1 g of molybdenum phosphide into the mixture and treat it with ultrasonic process with temperature being 45° C. for 2 hours. After the process of oxidation and aromatization, add deionized water which is the same volume as the reaction system and put it into pyrohydrolysis for 5 min, with temperature being controlled below 70° C., in order to protect the oxygen-containing functional groups of graphene oxide from being damaged. Finally, after the process of pyrohydrolysis, add hydrogen peroxide with the mass ratio of anthracite to it being 1:15 to remove needless oxidant. Then process the mature with suction filtration and washing, and we can obtain the dispersed liquid of anthracite oxide.

Then treat the mixture with ultrasonic stripping process with ultrasonic power being 500 W for 1 hour to obtain graphene oxide colloid solution. Put the solution into centrifugal process with rotating speed being 4000 r/min for 5 min to remove unstripped graphene oxide and other carbon impurities. Then take the supernatant as graphene oxide solution. Add the same volume of ammonium sulfate solution with 2% mass concentration as the mixture to salt out and suction filtrate it. Wash the filter cake with 5 ml deionized water, and then wash it with 5 ml ethyl alcohol and dry it in a vacuum oven with temperature being 55° C. for 2 hours. After all those processes, we obtain the first target product, graphene oxide, with the total mass of 1.19 g. The productive rate is 119% in term of anthracite powder.

Disperse graphene oxide obtained above in deionized water with mass concentration being 0.1 g/ml, and then add hydrazine hydrate with mass concentration being 80%. The mass ratio of hydrazine hydrate to graphene oxide is 1:5. Reflux the mixture for 1 hour. Afterwards put the mixture into ultrasonic cleaner with 300 W power for ultrasonic treatment of 3 hours and suction filtrate it. Then dry it under vacuum environment of 120° C. for 1 hour and we can obtain the second target product, graphene, with a total mass of 0.76 g. The productive rate is 76% in term of anthracite.

Both graphene oxide and graphene of our products, characterized by Raman spectra, have D-peak, G-peak and 2D-peak, which are unique to graphene. D-peak of graphene oxide is 1349 $cm^{-1}$, and G-peak and 2D-peak are 1603 $cm^{-1}$ and 2722 $cm^{-1}$, respectively; D-peak of graphene is 1370 $cm^{-1}$, and G-peak and 2D-peak are 1591 $cm^{-1}$ and 2706 $cm^{-1}$, respectively.

Execution Example 6

Put the raw materials of anthracite into processes of washing, drying and grinding, and then put them through 200-mesh sieves to obtain comparatively clean anthracite powder. Process the anthracite powder with molten sodium hydroxide, which could remove sulfur and silicon impurities and radicals in it. Then wash it till the pH value reaching 7.4 and dry it, then we can obtain ultra-clean anthracite powder. Take 1 g of anthracite powder, put it through ultrasonic dispersion into 10 ml of concentrated sulfuric acid. Then add 4 g nitrate of potash into the mixture and process it with ultrasonic treatment for 0.5 hours. Add water to dilute the mixture and then suction filtrate it to remove the solvent. Put the mixture into heating process under microwave condition of 900 W for 5 min and after air drying, grinding and sieving, we can obtain ultra-clean anthracite powder (For simplicity, it is referred to as anthracite powder in next section of this embodiment) with pre-treatment.

Take some anthracite powder and disperse it into 10 ml concentrated sulfuric acid, and process the mixture with ultrasonic treatment of 20° C. for 0.5 hours. Then gently add potassium permanganate and potassium persulfate the mass ratio of which to anthracite powder is 1:4 and 1:2, respectively, in the term of 1 g per minute into the mixture system. Then add 0.1 g of molybdenum trioxide into the mixture and treat it with ultrasonic process with temperature being 40° C. for 1 hour. After the process of oxidation and aromatization, add deionized water which is the same volume as the reaction system and put it into pyrohydrolysis for 5 min with temperature being controlled below 100° C., in order to protect the oxygen-containing functional groups of graphene oxide from being damaged. Finally, after pyrohydrolysis, add hydrogen peroxide with the mass ratio of anthracite to it being 1:5 to remove needless oxidant. Then process the mixture with suction filtration and washing, and we can obtain the dispersed liquid of anthracite oxide.

Then treat the mixture with ultrasonic stripping process with ultrasonic power being 600 W for 2 hours to obtain graphene oxide colloid solution. Put the solution into centrifugal process with rotating speed being 4000 r/min for 5 min to remove unstripped graphene oxide and other carbon impurities. Then take the supernatant as graphene oxide solution. Add ammonium sulfate solution with 2% mass concentration and the same volume as the mixture to salt out and suction filtrate it. Wash the filter cake with 5 ml deionized water, and then wash it with 5 ml ethyl alcohol and dry it in a vacuum oven with temperature being 55° C. for 2 hours. After all those processes, we obtain the first target product, graphene oxide, with the total mass of 1.5 g. The productive rate is 150% in term of anthracite powder.

Disperse graphene oxide obtained above in N-methyl pyrrolidone with mass concentration being 0.1 g/ml, and then add metallic lithium-ethylenediamine solution with mass concentration being 5%. The mass ratio of metallic lithium-ethylenediamine solution to graphene oxide is 1:5. Reflux the mixture for 1 hour. Afterwards put the mixture into ultrasonic cleaner with 120 W power for ultrasonic treatment of 1 hour, and suction filtrate it. Then dry it under vacuum environment of 120° C. for 1 hour and we can obtain the second target product, graphene, with a total mass of 0.97 g. The productive rate is 97% in term of anthracite.

Both graphene oxide and graphene of our products, characterized by Raman spectra, have D-peak, G-peak and 2D-peak, which are unique to graphene. D-peak of graphene oxide is 1311 $cm^{-1}$ and G-peak and 2D-peak are 1595 $cm^{-1}$ and 2881 $cm^{-1}$, respectively; D-peak of graphene is 1376 $cm^{-1}$, and G-peak and 2D-peak are 1580 $cm^{-1}$ and 2754 $cm^{-1}$, respectively.

Comparative Example 1

Take 1 g graphite powder and synthesize graphene oxide with standard Hummers method, we obtain the first target product, graphene oxide, with the total mass of 0.89 g. The productive rate is 89% in term of graphite. Use graphene oxide obtained to prepare graphene by microwave thermal reduction method, and we can obtain the second target product, graphene, with a total mass of 0.45 g. The productive rate is 45% in term of graphite.

Both graphene oxide and graphene of our products, characterized by Raman spectra, have D-peak, G-peak and 2D-peak, which are unique to graphene. D-peak of graphene oxide is 1364 $cm^{-1}$, and G-peak and 2D-peak are 1600 $cm^{-1}$ and 2835 $cm^{-1}$, respectively; D-peak of graphene is 1374 $cm^{-1}$, and G-peak and 2D-peak are 1582 $cm^{-1}$ and 2759 $cm^{-1}$, respectively.

According to the productive rates of execution examples 1-6 and comparative example 1, the productivity of graphene oxide and graphene prepared by anthracite is apparently larger than that prepared by traditional ways using graphite. Firstly, from the perspective of raw materials, graphite costs more than anthracite. Secondly with the same weight of raw materials, production output of graphene oxide and, graphene prepared by anthracite is larger than that prepared by traditional method using graphite, Thus reducing the production cost effectively.

According to the data from execution examples 1-6 and comparative example 1, it's obvious that with the raw materials at the same weight, production output of graphene oxide and graphene prepared by anthracite is larger than that prepared by traditional method using graphite. It can be concluded that our invention could save the production cost of graphene oxide and graphene effectively.

Comparative Example 2

Take some anthracite powder and synthesize graphene oxide by standard Hummers method. After many repeated experiments, it is fond that if we synthesize graphene oxide and graphene by standard Hummers method using anthracite as raw material, we cannot obtain desirable products. Thus our invention overcomes the technical bias that it's impossible to synthesize graphene oxide and graphene by existing technology using anthracite, and reduces the production cost of graphene and graphene oxide by our own original process.

Execution Example 7

Put the raw materials of anthracite into processes of washing, drying and grinding, and then put them through 200-mesh sieves to obtain comparatively clean anthracite powder. Process the anthracite powder with the mixture of molten cesium hydroxide and potassium hydroxide, which could remove sulfur and silicon impurities and radicals in it. Then wash it till the pH value reaching 7.2 and dry it, then we can obtain ultra-clean anthracite powder. Take 1 g ultra-clean anthracite powder, put it through ultrasonic dispersion into 10 ml deionized water. Then add 2 g of ammonium persulfate into the mixture and process it with ultrasonic treatment for 1 hour. Add water to dilute the mixture and then suction filtrate it to remove the solvent. Put the mixture into heating process under microwave condition of 400 W for 5 min and after air drying, grinding and sieving, we can obtain ultra-clean anthracite powder (For simplicity, it is referred to as anthracite powder in next section of this embodiment) with pre-treatment.

Take some anthracite powder and disperse it into 0.2 ml of strong phosphoric acid, and process the mixture with ultrasonic treatment of 20° C. for 0.5 hours. Then gently add 0.2 g potassium permanganate and 0.02 g cuprous chloride and treat it with ultrasonic process with temperature being 30° C. for 0.5 hours. After oxidation and aromatization, add deionized water which is the same volume as the reaction system and put it into pyrohydrolysis for bruin, with temperature being 70° C., in order to protect the oxygen-containing functional groups of graphene oxide from being damaged. Finally, after the process of pyrohydrolysis, add 8 g hydrogen peroxide to remove needless oxidant. Then process the mixture with suction filtration and washing, and we can obtain the dispersed liquid of anthracite oxide.

Then treat the mixture with ultrasonic stripping process with ultrasonic power being 100 W for 1 hour to obtain graphene oxide colloid solution. Put the solution into centrifugal process with rotating speed being 4000 r/min for 5 min to remove unstripped graphene oxide and other carbon impurities. Then take the supernatant as graphene oxide solution. Add ammonium sulfate solution with 2% mass concentration and the same volume as the mixture to salt out and suction filtrate it. Wash the filter cake with 5 ml deionized water, and then wash it with 5 ml ethyl alcohol and dry it in a vacuum oven with temperature being 55° C. for 2 hours. After all those processes, we obtain the first target product, graphene oxide, with the total mass of 1.1 g. The productive rate is 110% in term of anthracite powder.

Disperse graphene oxide obtained above in 11 ml concentrated sulfuric acid, and then add 1.1 g electronic am mine solution with mass concentration being 1%. Reflux the mixture for 1 hour. Afterwards put the mixture into ultrasonic cleaner with 100 W power for ultrasonic treatment of 0.5 hours, and suction filtrate it. Then dry it under vacuum environment of 120° C. for 1 hour and we can obtain the second target product, graphene, with a total mass of 0.79 g. The productive rate is 79% in term of anthracite.

Both graphene oxide and graphene of our products, characterized by Raman spectra, have D-peak, G-peak and 2D-peak, which are unique to graphene, D-peak graphene oxide is 1357 $cm^{-1}$, and G-peak and 2D-peak are 1602 $cm^{-1}$ and 2843 $cm^{-1}$, respectively; D-peak of graphene is 1369 $cm^{-1}$, and G-peak and 2D-peak are 1579 $cm^{-1}$ and 2710 $cm^{-1}$, respectively.

Execution Example 8

Put the raw materials of anthracite into processes of washing, drying and grinding, and then put them through 200-mesh sieves to obtain comparatively clean anthracite powder. Process the anthracite powder with the mixture of molten sodium hydroxide and potassium hydroxide, which could remove sulfur and silicon impurities and radicals in it. Then wash it till the pH value reaching 7.2 and dry it, then we can obtain ultra-clean anthracite powder. Take 1 g ultra-clean anthracite powder put it through ultrasonic dispersion into 20 ml concentrated nitric acid. Then add 3 g phosphorus pentoxide into the mixture and process it with ultrasonic treatment for 1 hour. Add water to dilute the mixture and then suction filtrate it to remove the solvent. Put the mixture into heating process under microwave condition of 500 W for 10 min and after air drying, grinding and sieving, we can obtain ultra-clean anthracite powder (For simplicity, it is referred to as anthracite powder in next section of this embodiment) with pre-treatment.

Take some anthracite powder and disperse it into 1 ml boric acid, and process the mixture with ultrasonic treatment of 20° C. for 1 hour. Then gently add 0.1 g fuming nitric acid and 0.05 g ferrous chloride and treat it with ultrasonic process with temperature being 40° C. for 0.8 hours. After the process of oxidation and aromatization, add deionized water which is the same volume as the reaction system and put it into pyrohydrolysis for 2 min, with temperature being 75° C., in order to protect the oxygen-containing functional groups of graphene oxide from being damaged. Finally, after the process of pyrohydrolysis add 15 g hydrogen peroxide to remove needless oxidant. Then process the mixture with suction filtration and washing, and we can obtain the dispersed liquid of anthracite oxide.

Then treat the mixture with ultrasonic stripping process with ultrasonic power being 200 W for 2 hours to obtain graphene oxide colloid solution. Put the solution into centrifugal process with rotating speed being 4000 r/min for 5 min to remove unstripped graphene oxide and other carbon impurities. Then take the supernatant as graphene oxide solution. Add the same volume of ammonium sulfate solution with 3% mass concentration as the mixture to salt out and suction filtrate it. Wash the filter cake with 5 ml deionized water, and then wash it with 5 ml ethyl alcohol and dry it in a vacuum oven with temperature being 55° C. for 2 hours. After all those processes, we obtain the first target product, graphene oxide, with the total mass of 1.24 g. The productive rate is 124% in term of anthracite powder.

Disperse graphene oxide obtained above in 1.24 ml concentrated nitric acid, and then add 4 g of hydrazine hydrate with mass concentration being 80%. Reflux the mixture for 1 hour. Afterwards put the mixture into ultrasonic cleaner with 150 W power for ultrasonic treatment of 1 hour, and suction filtrate it. Then dry it under vacuum environment of 120° C. for 1 hour and we can obtain the second target product, graphene, with a total mass of 0.83 g. The productive rate is 83% in term of anthracite.

Both graphene oxide and graphene of our products, characterized by Raman spectra, have D-peak. G-peak and 2D-peak, which are unique to graphene. D-peak of graphene oxide is 1350 $cm^{-1}$, and G-peak and 2D-peak are 1587 $cm^{-1}$ and 2839 $cm^{-1}$, respectively; D-peak of graphene is 1372 $cm^{-1}$, and G-peak and 2D-peak are 1578 $cm^{-1}$ and 2700 $cm^{-1}$, respectively.

Execution Example 9

Put the raw materials of anthracite into processes of washing, drying and grinding, and then put them through 200-mesh sieves to obtain comparatively clean anthracite powder. Process the anthracite powder with the mixture of molten sodium hydroxide and cesium hydroxide, which could remove sulfur and silicon impurities and radicals in it. Then wash it till the pH value reaching 7.2 and dry it, then we can obtain ultra-clean anthracite powder. Take 1 g of ultra-clean anthracite powder, put it through ultrasonic dispersion into 30 ml of aqueous TBAB solution with mass concentration being 5%. Then add 4 g potassium persulfate and 1 g Iodinopentoxide into the mixture and process it with ultrasonic treatment for 1 hour. Add water to dilution the mixture and then suction filtrate it to remove the solvent. Put the mixture into heating process under microwave condition of 600 W for 15 min and after air drying, grinding and sieving, we can obtain ultra-clean anthracite powder (For simplicity, it is referred to as anthracite powder in next section of this embodiment) with pre-treatment.

Take some anthracite powder and disperse it into 4 ml of ferric trichloride, and process the mixture with ultrasonic treatment of 20° C. for 2 hours. Then gently add 0.3 g potassium perchlorate and 0.06 g zinc chloride and treat it with ultrasonic process with temperature being 50° C. for 1 hour. After the process of oxidation and aromatization, add deionized water which is the same volume as the reaction system and put it into pyrohydrolysis for 3 min, with temperature being 80° C., in order to protect the oxygen-containing functional groups of graphene oxide from being damaged. Finally, after the process of pyrohydrolysis, add 18 g of hydrogen peroxide to remove needless oxidant. Then process the mixture with suction filtration and washing, and we can obtain the dispersed liquid of anthracite oxide.

Then treat the mixture with ultrasonic stripping process with ultrasonic power being 300 W for 4 hours to obtain graphene oxide colloid solution. Put the solution into centrifugal process with rotating speed being 4000 r/min for 5 min to remove unstripped graphene oxide and other carbon impurities. Then take the supernatant as graphene oxide solution. Add ammonium sulfate solution with 4% mass concentration and the same volume as the mixture to salt out and suction filtrate it. Wash the filter cake with 5 ml deionized water, and then wash it with 5 ml ethyl alcohol and dry it in a vacuum oven with temperature being 55° C. for 2 hours. After all those processes, we obtain the first target product, graphene oxide, with the total mass of 1.48 g. The productive rate is 148% in term of anthracite powder.

Disperse graphene oxide obtained above in 10 ml of aqueous TBAB solution with mass concentration being 5%, and then add 3 g of sodium thiosulfate. Reflux the mixture for 1 hour. Afterwards put the mixture into ultrasonic cleaner with 200 W power for ultrasonic treatment of 1.5 hours, and suction filtrate it. Then dry, it under vacuum environment of 120° C. for 1 hour and we can obtain the second target product, graphene, with a total mass of 0.94 g. The productive rate is 94% in term of anthracite.

Both graphene oxide and graphene of our products, characterized by Raman spectra, have D-peak, G-peak and 2D-peak, which are unique to graphene. D-peak of graphene oxide is 1363 $cm^{-1}$, and G-peak and 2D-peak are 1585 $cm^{-1}$ and 2845 $cm^{-1}$, respectively; D-peak of graphene is 1370 $cm^{-1}$, and G-peak and 2D-peak are 1580 $cm^{-1}$ and 2705 $cm^{-1}$, respectively.

Execution Example 10

Put the raw materials of anthracite into processes of washing, drying and grinding, and then put them through 200-mesh sieves to obtain comparatively clean anthracite powder. Process the anthracite powder with the mixture of molten sodium hydroxide, potassium hydroxide and cesium hydroxide, which could remove sulfur and silicon impurities and radicals in it. Then wash it till the pH value reaching 7.2 and dry it, then we can obtain ultra-clean anthracite powder. Take 1 g of ultra-clean anthracite powder, put it through ultrasonic dispersion into 40 ml of strong phosphoric acid. Then add a mixture of 0.5 g of nitrate of potash and 1 g of Iodinepentoxide into the mixture and process it with ultrasonic treatment for 1 hour. Add water to dilute the mixture and then suction filtrate it to remove the solvent. Put the mixture into heating process under microwave condition of 700 W for 20 min and after air drying, grinding and sieving, we can obtain ultra-clean anthracite powder (For simplicity, it is referred to as anthracite powder in next section of this embodiment) with pre-treatment.

Take some anthracite powder and disperse it into 6 ml of ferric trichloride, and process the mixture with ultrasonic treatment of 20° C. for 0.8 hours. Gently add a mixture of 0.1 g potassium perchlorate and 0.4 g potassium permanganate, then add 0.08 g manganese chloride and treat it with ultrasonic process with temperature being 50° C. for 1.5 hours. After the process of oxidation and aromatization, add deionized water which is the same volume as the reaction system and put it into pyrohydrolysis for 4 min, with temperature being 90° C., in order to protect the oxygen-containing functional groups of graphene oxide from being damaged. Finally, after the process of pyrohydrolysis, add 20 g of hydrogen peroxide to remove needless oxidant. Then process the mixture with suction filtration and washing, and we ran obtain the dispersed liquid of anthracite oxide.

Then treat the mixture with ultrasonic stripping process with ultrasonic power being 500 W for 3 hours to obtain graphene oxide colloid solution. Rut the solution into centrifugal process with rotating speed being 4000 r/min for 5 min to remove unstripped grapheme oxide and other carbon impurities. Then take the supernatant as graphene oxide solution. Add ammonium sulfate solution with 3.5% mass concentration and the same volume as the mixture to salt out and suction filtrate it. Wash the filter cake with 5 ml deionized water, and then wash it with 5 ml ethyl alcohol and dry it in a vacuum oven with temperature being 55° C. for 2 hours. After all those processes, we obtain the first target product, graphene oxide, with the total mass of 1.05 g. The productive rate is 105% in term of anthracite powder.

Disperse grapheme oxide obtained above in 70 ml of aqueous CTAB solution with mass concentration being 5%, and then add 2 g united dithionite. Reflux the mixture for 1 hour. Afterwards put the mixture into ultrasonic cleaner with 250 W power for ultrasonic treatment of 2 hours, and suction filtrate it. Then dry it under vacuum environment of 120° C. for 1 hour and we can obtain the second target product, graphene, with a total mass of 0.78 g. The productive rate is 78% in term of anthracite.

Both graphene oxide and graphene of our products, characterized by Raman spectra, have D-peak, G-peak and 2D-peak, which are unique to graphene. D-peak of graphene oxide is 1355 $cm^{-1}$, and G-peak and 2D-peak are 1588 $cm^{-1}$ and 2850 $cm^{-1}$, respectively; D-peak of graphene is 1370 $cm^{-1}$, and G-peak and 2D-peak are 1582 $cm^{-1}$ and 2700 $cm^{-1}$, respectively.

Execution Example 11

Put the raw materials of anthracite into processes of washing, drying and grinding, and then put them through 200-mesh sieves to obtain comparatively clean anthracite powder. Process the anthracite powder with potassium hydroxide, which could remove sulfur and silicon impurities and radicals in it. Then wash it till the pH value reaching 7.2 and dry it, then we can obtain ultra-clean anthracite powder. Take 1 g ultra-clean anthracite powder, put it through ultrasonic dispersion into a mixture of 20 ml deionized water and 30 ml glycol, and process it with ultrasonic treatment for 1 hour. Add water to dilute the mixture and then suction filtrate it to remove the solvent. Put the mixture into heating process under microwave condition of 800 W for 25 min and after air drying, grinding and sieving, we can obtain ultra-clean anthracite powder (For simplicity, it is referred to as anthracite powder in next section of this embodiment) with pre-treatment.

Take some of the anthracite powder and disperse it into 8 ml of aluminiumtrichloride, and process the mixture with ultrasonic treatment of 20° C. for 1.2 hours. Gently add a mixture of 0.1 g filming nitrite acid, 0.12 potassium permanganate and 0.2 g sodium perchlorate, then add 0.1 g molybdenum phosphide and treat it with ultrasonic process with temperature being 35° C. for 1.8 hours. After the process of oxidation and aromatization, add deionized water which is the same volume as the reaction system and put it into pyrohydrolysis for 4.5 min, with temperature being 95° C., in order to protect the oxygen-containing functional groups of graphene oxide from being damaged. Finally, after the process of pyrohydrolysis, add 10 g hydrogen peroxide to remove needless oxidant. Then process the mixture with suction filtration and washing, and we can obtain the dispersed liquid of anthracite oxide.

Then treat the mixture with ultrasonic stripping process with ultrasonic power being 550 W for 3.5 hours to obtain graphene oxide colloid solution. Put the solution into centrifugal process with rotating speed being 4000 r/min for 5 min to remove unstripped graphene oxide and other carbon impurities. Then take the supernatant as graphene oxide solution. Add ammonium sulfate solution with 2.5% mass concentration and the same volume as the mixture to salt out and suction filtrate it. Wash the filter cake with 5 ml deionized water, and then wash it with 5 ml ethyl alcohol and dry it in a vacuum oven with temperature being 55° C. for 2 hours. After all those processes, we obtain the first target product, graphene oxide, with the total mass of 1.37 g. The productive rate is 137% in term of anthracite powder.

Disperse graphene oxide obtained above into mixed liquid of 6 ml deionized water, 2 ml glycerol and 1 ml glycol, and then add 4.5 g phosphate ester. Reflux the mixture for 1 hour. Afterwards put the mixture into ultrasonic cleaner with 300 W power for ultrasonic treatment of 2.5 hours, and suction filtrate it. Then dry it under vacuum environment of 120° C. for 1 hour and we can obtain the second target product, graphene with a total mass of 0.9 g. The productive rate is 90% in term of anthracite.

Both graphene oxide and graphene of our products, characterized by Raman spectra, have D-peak. G-peak and 2D-peak, which are unique to graphene. D-peak of graphene oxide is 1359 $cm^{-1}$, and G-peak and 2D-peak are 1590 $cm^{-1}$ and 2850 $cm^{-1}$, respectively; D-peak of graphene is 1375 $cm^{-1}$, and G-peak and 2D-peak are 1580 $cm^{-1}$ and 2707 $cm^{-1}$, respectively.

Execution Example 12

Put the raw materials of anthracite into processes of washing, drying and grinding, and then put them through 200-mesh sieves to obtain comparatively clean anthracite powder. Process the anthracite powder with potassium hydroxide, which could remove sulfur and silicon impurities and radicals in it. Then wash it till the pH value reaching 7.2 and dry it, then we can obtain ultra-clean anthracite powder. Take 1 g of ultra-clean anthracite powder, put it through ultrasonic dispersion into a mixture of 30 ml of aqueous CTAB solution with mass concentration being 5% and 20 ml of glycerol. Add 1 g ammonium persulfate, 12 potassium sulphate, 1 g nitrate of potash, 1 g phosphorus pentoxide and 1 g iodine pentoxide into the mixture and process it with ultrasonic treatment for 1 hour. Add water to dilute the mixture and then suction filtrate it to remove the solvent. Put the mixture into heating process under microwave condition of 900 W for 30 min and after air drying, grinding and sieving, we can obtain ultra-clean anthracite powder (For simplicity, it is referred to as anthracite powder in next section of this embodiment with pre-treatment.

Take some anthracite powder and disperse it into 10 ml of boric acid, and process the mixture with ultrasonic treatment of 20° C. for 1.8 hours. Gently add a mixture of 0.1 g finning nitrite acid, 0.2 g potassium permanganate and 0.2 g sodium perchlorate, then add 0.1 g zinc phosphide and treat it with ultrasonic process with temperature being 45° C. for 2 hours. After the process of oxidation and aromatization, add deionized water which is the same volume as the reaction system and put it into prohydrolysis for 5 min, with temperature being 100° C., in order to protect the oxygen-containing functional groups of graphene oxide from being damaged. Finally, after the process of pyrohydrolysis, add 5 g hydrogen peroxide to remove needless oxidant. Then process the mixture with suction filtration and washing and we can obtain the dispersed liquid of anthracite oxide.

Then treat the mixture with ultrasonic stripping process with ultrasonic power being 600 W for 5 hours to obtain graphene oxide colloid solution. Put the solution into centrifugal process with rotating speed being 4000 r/min for 5 min to deposit unstripped graphene oxide and other carbon impurities. Then take the supernatant as graphene oxide solution. Add the same volume of ammonium sulfate solution with 5% mass concentration as the mixture to salt out and suction filtrate it. Wash the filter cake with 5 ml deionized water, and then wash it with 5 ml ethyl alcohol and dry it in a vacuum oven with temperature being 55° C. for 2 hours. After all those processes, we obtain the first target product, graphene oxide, with the total mass of 1.3 g. The productive rate is 130% in term of anthracite powder.

Disperse graphene oxide obtained above into 8 ml of N-methyl-2-pyrrolidone, then add 5 g of sodium thiosulfate and 1.5 g of united dithionite into the mixture. Reflux the mixture for 1 hour. Afterwards put the mixture into ultrasonic cleaner with 280 W power for ultrasonic treatment of 3 hours, and suction filtrate it. Then dry it under vacuum environment of 120° C. for 1 hour and we can obtain the second target products, graphene, with a total mass of 0.86 g. The productive rate is 86% in term of anthracite.

Both graphene oxide and graphene of our products, characterized by Raman spectra, have D-peak, G-peak and 2D-peak, which are unique to graphene. D-peak of graphene oxide is 1364 $cm^{-1}$, and G-peak and 2D-peak are 1603 $cm^{-1}$ and 2847 $cm^{-1}$, respectively; D-peak of graphene is 1368 $cm^{-1}$, and G-peak and 2D-peak are 1582 $cm^{-1}$ and 2703 $cm^{-1}$, respectively.

According to the data from execution examples 7-12 and comparative example 1, it's obvious that with the raw materials at the same weight, production output of graphene oxide and graphene prepared by anthracite is larger than that prepared by traditional method using graphite. It can be concluded that our invention could save the production cost of graphene oxide and graphene effectively.

The execution modes above are optimized modes for our invention, and it cannot be used to limit the protection scope of our present invention. Any insubstantial change and replacement based on our present invention by technical staff in this field all belongs to the protection scope required by our invention.

What is claimed is:
1. A method of preparing graphene, comprising:
  a. Adding graphene oxide to a dispersant selected from the group consisting of deionized water, inorganic acid, surfactant solution, high boiling solvents, and combinations thereof to form a graphene oxide dispersion having a graphene oxide concentration of 0.1-1 g/ml;
  b. Adding the graphene oxide dispersant to a microwave oven and applying microwave energy at 900 W for 5-20 minutes or adding a reducing agent selected from the group consisting of electronic amine solution having a mass concentration of 1%, hydrazine hydrate having a mass concentration of 80%, sodium thiosulfate, united dithionite, phosphite esters, and combinations thereof, to the graphene oxide dispersion at a ratio of 1:1-5 and refluxing for 1 hour to produce a reduced graphene oxide dispersion;
  c. Applying a supersonic treatment to the reduced graphene oxide dispersant for 0.5-3 hours with a supersonic power of 100-300 W; and d. Performing suction filtration and drying to the reduced graphene oxide dispersion to produce graphene.

2. The method of claim 1, wherein the inorganic acid in step a is selected from the group consisting of strong phosphoric acid, concentrated sulfuric acid; the surfactant in step a is selected from the group consisting of cetyltrimethyl ammonium bromide aqueous solution with a mass concentration of 5%, tetrabutyl ammonium bromide aqueous solution with a mass concentration of 5%, and wherein the high boiling point solvent is selected from the group consisting of glycerol, glycol and N-methyl-2-pyrrolidone.

3. The method of claim 1, wherein the reducing agent in step b is selected from the group consisting of hydrazine hydrate with a mass concentration of 80%, electronic amine solution with a mass concentration of 1%, united dithionite and combinations thereof.

* * * * *